United States Patent [19]

Schneider

[11] Patent Number: 4,979,106
[45] Date of Patent: Dec. 18, 1990

[54] CUSTOMIZATION OF A SYSTEM CONTROL PROGRAM IN RESPONSE TO INITIALIZATION OF A COMPUTER SYSTEM

[75] Inventor: Frederick W. Schneider, Mountain View, Calif.

[73] Assignee: Amdahl Corporation, Sunnyvale, Calif.

[21] Appl. No.: 237,890

[22] Filed: Aug. 29, 1988

[51] Int. Cl.⁵ .............................................. G06F 9/44
[52] U.S. Cl. ................................... 364/200; 364/280; 364/280.2
[58] Field of Search ... 364/200 MS File, 900 MS File

[56] References Cited

U.S. PATENT DOCUMENTS

| | | | |
|---|---|---|---|
| 3,736,567 | 5/1973 | Lotan et al. | 364/200 |
| 4,177,514 | 12/1979 | Rupp | 364/200 |
| 4,345,319 | 8/1982 | Bernardini et al. | 371/10.1 |
| 4,503,491 | 3/1985 | Lushtak et al. | 364/200 |
| 4,591,982 | 5/1986 | Buonomo et al. | 364/200 |
| 4,635,187 | 1/1987 | Baron et al. | 364/200 |

Primary Examiner—Raulfe B. Zache
Attorney, Agent, or Firm—Fliesler, Dubb, Meyer & Lovejoy

[57] ABSTRACT

In operating a computer system which has changeable operating characteristics and configurations, the operating characteristics and configuration of the computer is investigated at each initialization thereof. In response to the results of the investigation, a system control program is customized to the current operating characteristics and configurations so that it can provide control of the computer system.

20 Claims, 2 Drawing Sheets

CUSTOMIZATION OF A SYSTEM CONTROL PROGRAM IN RESPONSE TO INITIALIZATION OF A COMPUTER SYSTEM

TECHNICAL FIELD

The present invention generally relates to the operation of a computer system and particularly to a system control program which manages the operation of a computer system. More specifically, the present invention relates to a method and apparatus for adapting a system control program to the operational characteristics and configuration of a computer system wherein the system control program resides.

BACKGROUND OF THE INVENTION

System control program (SCP), also known as an operating system, is a computer program which manages the operation of a computer system. The functions of a SCP basically include scheduling and supervising operation of user tasks, and managing and arbitrating system resources (for example, storage space and input/output devices) among competing users.

A SCP can also enhances the "user-friendliness" of a computer system, by allowing a user to communicate in high-level, concise languages with the low-level hardware of the computer system. The SCP issues, in response specific user commands, instruction sequences that are adapted to the characteristics of the system, and thereby relieves the user from having to code many complex routines As an example, to store data in a direct access storage device, a user, with the assistance of a SCP, can simply issue such commands as "open file", "read file" and "write file". Without the assistance of a SCP, the user may have to code a sequence of machines instructions that may include, for example, testing the statuses of the computer's input/output channel, testing the statuses of the device, positioning the read/write head of the device, reading and/or writing the device, determining the success of the operation, and performing error recoveries if the operation fails.

To satisfy the diverse processing requirements of users, a computer maker usually provides different models of a basic type of computer. For example, the IBM System/370 family of computers has such models as the 145, 168, 3033, XA, and other compatibles. Although the models of a computer family has the same basic architecture (that is, the basic instruction set), each model typically possesses different operational characteristics. For example, the IBM System/370 XA model has features such as a 31-bit addressing and dual address space which other models (for example, the IBM System/370 model 145) do not have.

In addition, even for computer systems with the same model, the configurations of individual computer systems, that is, the memory size, and the number and types of external devices attached thereto, the manner in which the external devices are attached etc., may vary from one computer to another.

In order for a SCP to perform the above-described functions, information concerning the operational characteristics and configuration of a computer system have to be provided to the SCP.

In some prior art systems, provision of such information is typically performed by a system operator in a process commonly known as a system generation (SYSGEN). During the system generation process, the operator determines the system configuration and, based upon the information, creates a system definition data set (SYSDEF). This system definition data set is then compiled into a starter SCP to build a operational SCP. Once the operational SCP is built, it is loaded into the system memory each time the computer is initialized (during Initial Program Load, IPL).

However, for many computers, the process of creating the system definition and compiling into the SCP is usually a tedious process. Moreover, if the configuration of the computer system changes by the addition or removal of one or more devices, or if a different model of computer is used, the system definition has to be recreated and the SCP has to be rebuilt.

In other prior art computer systems, such as the IBM personal computers, the system generation process is eliminated by fixing certain types of devices to dedicated input/output ports. The SCP is implemented so that it can only communicate with a particular type of device at a particular input/output port. If a different device is attached to a port, then a special support program is added to the SCP or the configuration is redefined.

An object of the invention is to allow a SCP to start operation without performing the SYSGEN process.

Another object of the invention is to allow a computer system to start operation without needing to build a SCP even after the configuration of the system has been changed.

SUMMARY OF THE INVENTION

The present invention is a method for operating a computer system. The computer system has selectable operational characteristics and configurations. According to the present invention, the current system environment of the computer system, including its operational characteristics and configuration, is investigated at each initialization of the computer. Based upon such investigation, the system control program is adjusted to enable it to control the operation of the system.

In the preferred implementation of the present invention, the investigation is performed on a hierarchical basis wherein the features to be investigated are structured based upon their respective dependence on other features

DESCRIPTION OF THE PREFERRED EMBODIMENT

Figure 1:
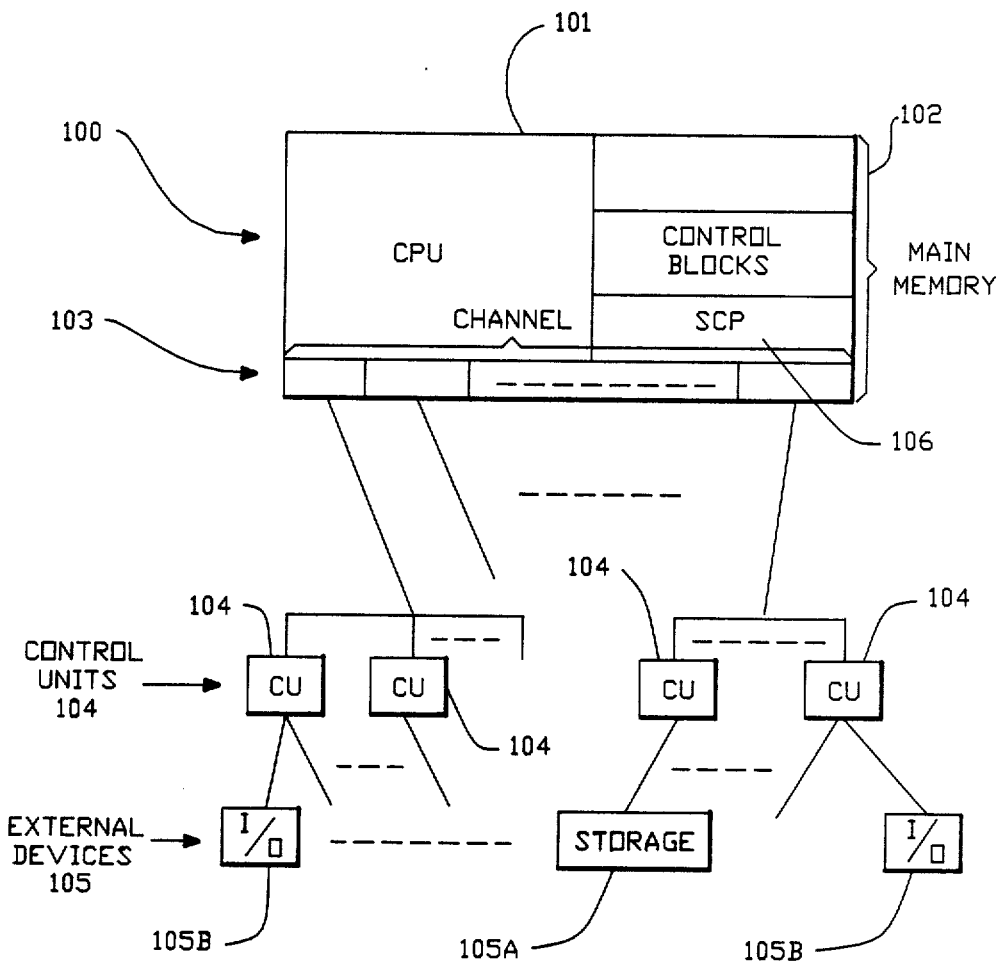
FIG. 1 is a block illustrating a computer system wherein the present invention is embodied.

FIG. 1 shows a block diagram of a computer system 100 wherein the present invention is embodied. Computer system 100 includes a central processing unit (CPU) 101, a main memory 102, and a plurality of channels 103. Connected to the channels are one or more control units 104 (CU) each of which controls a plurality of external devices 105. The external devices 105 include a plurality of storage devices 105a and a plurality of input/output devices 105b.

Operation of the computer system 100 is controlled by a system control program (SCP) 106 which resides in the main memory 102.

The CPU 101 of computer system 100 has more than one set of selectable operational characteristics. These operational characteristics include features that are provided by the architecture of an AMDAHL 580 computer, the IBM System/370 architecture as described in "System/370 Principles of Operation", IBM Publication number GA22-7085, or the IBM System/370 XA architecture as described in "System 370/Extended Architecture Principles of Operation", IBM Publication No. SA22-7085, such as the number of address bit (for example, 24-bit, 26-bit or 31-bit addressing), the number of address spaces (for example, single or dual address space), and the channel architecture (such as a subchannel architecture in the XA architecture).

The operational characteristics of the CPU 101 can be selected, for example, by changing the CPU 101 to a different model. It will be understood that aforementioned operational characteristics are given for illustration purposes only, there are obviously more selectable operational characteristics that can be implemented into a CPU.

The CPU 101 of the computer system 100 has a basic instruction set. However, when the operational characteristics of the CPU 101 changes such as by changing the CPU 101 to another model, additional instructions may be incorporated into the basic instruction set. When an instruction, which may be valid in one model of CPU 101, is encountered by another model of CPU 101 for which the instruction is not implemented, an indication, typically called an "operation exception", will be generated.

The configuration of the computer system 100 includes the size of the main memory 102 provided to the CPU 101. The configuration of the computer system 100 also includes the number and types of the external devices 105, as well as the manner in which these external devices 105 are connected. The external devices are connected to the channels, typically via the control units The channels of the computer system 100 are non-dedicated channels so that different types of devices can be connected to each channel, as long as the interfaces are compatible. The number of devices that can be connected to a channel may also vary, as long as it is less than a fixed number (for example 256).

Data and instructions may be addressed by the CPU 101 by virtual addressing. Typically in virtual addressing, a virtual address is divided into three parts. The first part of the virtual address (the segment address) is used to select an entry from a segment table. From this entry of the segment table, a page table is identified. The second part of the virtual address is then used to selected an entry from the identified page table. The entry selected from the page table is then combined with the third part of the virtual address to form a real address, which points to one or more locations in the storage space of the computer system 100.

The storage space of the computer system 100 is provided as a plurality of system pages stored in the external storage devices 105a. The storage space of the main memory 102 is a subset of the system storage space provided by a plurality of external storage devices 105a.

The storage space of the main memory 102 is partitioned into a plurality of fixed size pages. The number of main memory pages available in the computer system obviously depends upon the size of the main memory 102. When space in the main memory 102 is exhausted, one or more pages in the main memory 102 will be staged out into the external storage devices 105a so that the staged-out page locations can be reallocated.

The allocation of pages in the main memory 102 and the and the stage-out process are controlled by a real storage table (RST) which is maintained by the SCP 106. Each page in the main memory 102 is exclusively mapped into one entry in the RST. To maintain a correspondence between a main memory page and the system page, each page table entry in the RST contains the address of the system page being stored in the corresponding main memory page.

The external devices 105 typically operate asynchronously with respect to the operation of the CPU 101. To control the operation of the external devices 105, the SCP 106 is provided with a device control block for each external device 106. Each device control block contains information that relates to, for example, the statuses of the corresponding external device 105, the I/0 commands that are used for accessing the external device 105, etc. The device control block is accessed by the SCP 106 when it wants to start an I/0 operation or when an interrupt is received from an external device 105

The operation of the CPU 101 is controlled in part by a program status word (PSW). Included in the PSW is a instruction address counter which points to the location of main memory 102 that contains the next instruction to be executed by the CPU 101. When the CPU 101 is interrupted, the PSW will be stored into one of several preassigned locations (old PSW locations) in the main memory 102 and a new PSW will be loaded from one of several other preassigned locations (new PSW locations). The location into which the old PSW is stored and the location from which the new PSW is fetched is selected depending upon the cause of the interruption.

Typically, the new PSW will direct the CPU 101 to operate a routine designed to handle the interruption. Interrupts to the CPU 101 include interrupts caused by an external devices 105, interrupts caused by a malfunction, and interrupts caused by the execution of an invalid instruction.

Figure 2:
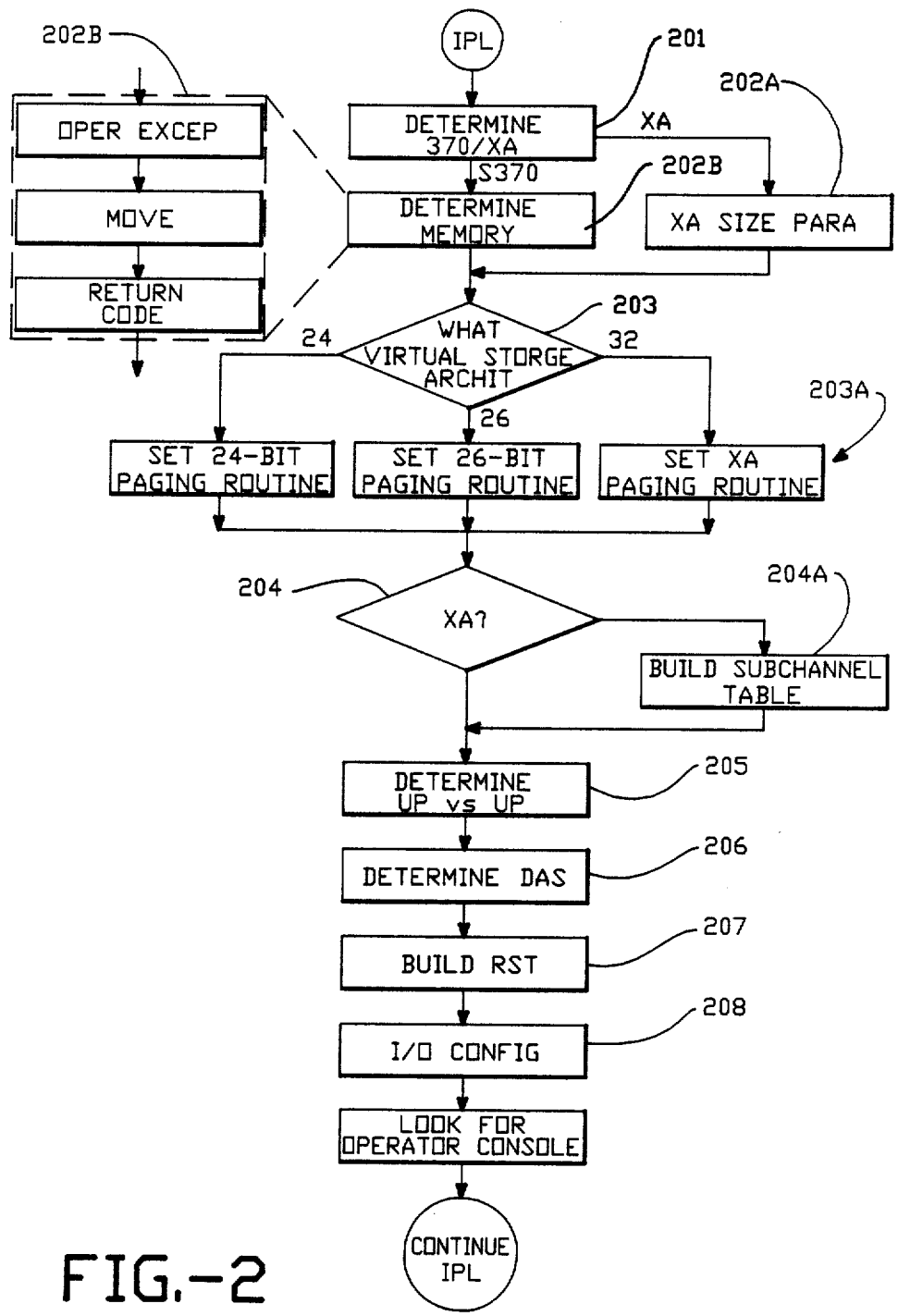
FIG. 2 is a flow chart illustrating the steps in a preferred embodiment for adapting the system control program to the operational environment of a computer system at each initialization thereof.

The flow chart of FIG. 2 illustrates the steps in the preferred embodiment for adapting a SCP 106 to the operational characteristics and the configuration of a computer system 100 In the flow chart of FIG. 2, an assumption is made that the CPU 101 has two sets of operational characteristics. These two sets of operational characteristics include a first set (basic) similar to the IBM System/370 basic architecture and a second set (XA) similar to the IBM System/370 XA architecture.

The steps illustrated in the flow chart of FIG. 2 are implemented as part of the SCP 106 which will be performed at each system initialization immediately after the computer system 100 is booted (or IPL'ed). The computer system 100 is investigation typically booted when an "IPL" signal is communicated thereto or when the IPL button is pressed.

During an initial program load, a starter SCP will booted from an external storage device 105 into the main memory when 102.

In step 201, a determination is then made to see whether the CPU 101 has the first or the second set of operating characteristics 370 or XA. In the preferred embodiment, step 201 is performed by issuing a "test block" instruction which, in provided, will clear the main memory 102 successively in blocks and returns a parameter, XA SIZE PARA in FIG. 2, that gives the size of the main memory 102. However, the "test block" instruction is valid only if it is issued by a CPU 102 that has the second set of operating characteristics.

If the "test block" instruction executes successful, a flag is set to indicate that CPU has the second set of operational characteristics.

IF the CPU 101 does not have a XA architecture, then an operation exception will be generated by the execution of the test block instruction. To handle a possible operation exception, the "new PSW location for the operation exception is set so that a step 202B will be executed, if an invalid instruction is issued In step 202B, a "store" instruction or a "MOVE" instruction is issued to move a zero into each location of the main memory 102. The store or the move instruction is issued starting from the beginning to the end of the main memory 102. When the end, of the main memory 102 is reached, a predefined RETURN CODE will result. At that point, the size of the main memory 102 will be known.

Next, in step 203, the virtual addressing scheme implemented in the CPU 101 is determined. In the preferred embodiment, the virtual addressing scheme of the CPU 101 has a 24-bit paging scheme, a 26-bit paging scheme and a 32-bit (XA) paging scheme. The differences in paging schemes will affect the virtual addressing of the CPU 101 because, for example, the size of the RST entries will be different.

The paging scheme of the CPU 101 can be determined by executing a "store cpu ID (STIDP)" instruction, which gives the particular model of the CPU 101, upon which the page scheme of the CPU 101 is depended. In the starter SCP, a routine is for each paging scheme, when the paging scheme of the CPU 101 is determined, a pointer is then set to point to the appropriate paging routine (step 203a).

The channel 103 of a computer system 100 with an XA architecture differs from the channel 103 of a computer system 100 with a basic 370 architecture, in that the XA architecture has a channel processor which has a plurality of subchannel control blocks each of which is assigned to an activated external device 105. When an external device 105 is installed to a XA type of computer system, the corresponding subchannel control block will be set. In step 204, if the CPU 101 has a XA architecture, then a determination is made to see how many subchannels are active in the computer system 100. After the number of subchannels is determined, a table is set up with one entry in the table assigned to each subchannel (step 204a).

Then in step 205, a determination is made to see whether the computer system 100 has a multiprocessor configuration. This is accomplished by issuing a "store CPU address (STAP)" instruction. If the computer system 100 does not have a multiprocessor configuration, then the instruction will fail.

In step 206, a "move with key (MVCK)" instruction is issued to determine whether the computer system has dual address space. Example of the instruction is:

MVCK 0(R2),0,R2

If the instruction completes successfully, then the computer system 100 has dual address space, otherwise a program check will result.

In step 207, the real storage table (RST) is built. As previously described, the RST is used to control the allocation of the main memory pages.

In step 208, the input/output configuration of the computer system 100 is determined.

Determination of the I/O configuration of the computer system 100 is performed differently depending upon whether computer system 100 has a basic System/370 architecture or a XA architecture.

For basic System/370 architecture, information concerning a channel 103 is obtained in the preferred embodiment by executing one of more instructions that simulate the operation of an IBM System/370 "Store Channel ID" (STIDC) instruction to obtain a resultant condition code. If the ID of a channel 103 is stored, then it is an indication that the corresponding channel 103 is operational.

The channel ID information obtained from the execution of a STIDC instruction will also indicate the channel type of the corresponding channel. The channel type may be, for example, a selector channel, a byte multiplexer channel, or a block multiplexer channel. The information obtained from a STIDC instruction also includes the length in bytes of the longest I/O extended logout that can be stored by the channel during an I/O interruption.

After the execution of a STIDC instruction, a location in the main store 102 is then allocated to build control block for each active channel 103. The allocation is performed using the RST that had been previously built. After the storage location for a control block is allocated, the information obtained from the operation of the STIDC instruction is then stored.

For each active channel 103, an operation is initiated on each control unit address, and to each external device address. In each operation, a check is made to see whether an external device 105 is connected to the channel 103 and if so, a check is then made to see how many sense bytes will be sent back from the external device 105.

Whether an external device 105 is connected to a channel 103 can be determined by performing an operation that is similar to the execution of an IBM/370 "Halt Device" instruction. The instruction also will give a condition code which indicates whether the external device 105 is operational.

For an external device 105 that is connected to the channel 103, a "sense" operation is then performed. The sense operation provides information concerning the status of the device. It may indicate, for example, whether the external device 105 is in the not-ready state, and if the external device is a tape unit, whether it is in the file-protected state, and whether a magnetic tape is positioned beyond the end-of-tape mark.

According to the IBM System/370 architecture, a sense operation to a device is performed by first storing a "sense" command in a channel command word (CCW). An exemplary sense command is given as:

Hexadecimal "0400 0000 3000 0020"

The "04" in the CCW indicates that it is a sense operation. The "020" in the CCW indicates that a 32-byte sense data is expected. The "30" in the CCW indicates that both transfer of information to main memory 102 and incorrect length indication, which will occur when the number of bytes contained in the storage areas assigned for the I/0 operation is not equal to the number of bytes requested or offered by the I/O device, are to be suppressed.

After the CCW is built, its address is put into a channel address word (CAW). A "start I/O" (SIO) or a "start I/0 fast release" (SIOF) type of instruction is then executed. When operation of the SIO or SIOF instruction is terminated, a CSW will be stored by the external device 105.

After the SIO or SIOF instruction is issued, the CPU 101 will then monitor for an I/O interrupt from the external device 105. Typically, when an I/O device interrupts the CPU 101, the current program status word (PSW) of the CPU 101 will be stored, and a new PSW will be fetched from a preassigned location ("I/O interrupt new PSW" location). In implementing the preferred embodiment, the "I/O interrupt new PSW" is modified so that a special sequence of instructions is performed upon receiving an I/0 interrupt.

In the special sequence of instructions, the CSW from the device will be monitored. The receipt of a CSW indicates that an external device 105 is attached to the control unit 104. Thus, when the CSW is received, a control unit control block (CUCB) is built - if one is not yet in existence. If a CUCB exists already or after a CUCB is built, then a device control block (DCB) for that external device 105 will be built within the CUCB.

The control unit control blocks (CUCB's) are built by first allocating one or more pages in the main memory. Again, such allocation is accomplished using the RST's previously set up.

By comparing the byte count in the CSW and the CCW, the number of sense bytes from an external device 105 is known although no actual data transfer occurred because the skip flag is set in the CCW.

If the external device 105 generates 24 sense bytes, then it is either a tape or a disk. In that case, another sense command is sent to the external device 105. However, in the second sense command, the skip flag is not set. If the external device 105 is a disk, then the sense data from the device will give a device label, a volume serial number and other information concerning the disk characteristics, such as the number of tracks per cylinder, the number of cylinder per volume and the number of page in a track. This information is then saved in the device control block (DCB) previously allocated to the external device 105.

If the CPU 101 has a XA architecture, then a "store subchannel" instruction is issued to each subchannel to see whether an active external device 105 is connected to that subchannel. For each subchannel that is coupled to a external device 105, a monitor subchannel instruction is executed to enable the subchannel control blocks with an active device.

After the subchannel blocks are enabled, a sense operation is performed to see how many sense bytes will be returned from the external device 105. If an external device 105 sends back 24 sense bytes, then another sense is performed to determine whether the external device 105 is a tape or a disk drive. The sense bytes also provide other characteristic information to the computer system 100.

After the channel configuration is performed, an attempt is made to read any old configuration data. The old configuration data is usually stored in the IPL device. The operation to check old configuration data may now use the control blocks (CUCB's and DCB's) that were set up during the channel configuration.

In step 209, a check is made from the old configuration data to see whether an operator console is defined. If yes, then the initialization is completed.

If there is no old configuration data, or no operator console is defined in the old configuration data, the CPU 101 will then wait for an "attention" signal from a console device among the input/output device 105b. Again, this is performed utilizing the control blocks (CUCB's and DCB's) previously set up during the channel configuration.

After an "attention" signal is received, the CPU 101 will assume that the console that generates the attention is selected as the operator console. However, the CPU 101 will wait for a confirmation. A confirmation is considered to be received if an external interrupt signal is received by the CPU 101. When an operator console is identified, its address will be written to the configuration data in the IPL device so that it can be used later.

As many different features can be implemented in a computer system or in a device, therefore, the foregoing description of the preferred embodiment of the present invention has been presented for the purpose of illustration only. It is not intended to be exhaustive or to limit the invention to the precise form disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with various modifications as such suit to the particular use contemplated. It is intended that the scope of the invention be defined by the accompanying claims and its equivalents.

What is claimed:

1. A method of operating a computer system under the control of a system control program, the computer system being capable of multiple initializations, the computer system being capable of having different operating configurations and characteristics, including a main memory with selectable size, and including a selectable number of input/output channels, each channel capable of communicating with more than one external device with different operating characteristics, the method comprising the steps of:

performing in the computer system one or more instructions to cause investigation, at each initialization of the computer system, of the operating characteristics and configuration of the computer system; and adjusting the system control program, under control of the computer system in response to said investigation after each initialization of the computer system, whereby the system control program is enabled to control the computer system as a function of the operating characteristics and configuration of the computer system.

2. A method as in claim 1, wherein the computer system is capable of addressing data and instructions with different sizes of addresses and wherein said operating characteristics include the size of addresses for addressing data and instructions in the computer system.

3. A method as in claim 1, wherein the computer system is capable of having system configurations formed of different types of external devices coupled to the computer system in different ways and wherein said system configurations-differ as a function of the types of external devices being coupled to the computer system and the way in which the devices are coupled to the computer system.

4. A method as in claim 1, wherein the system configurations include multiprocessor and single-processor configurations.

5. A method as in claim 1, wherein said investigation includes executing one or more instructions in the computer system and monitoring return codes in the computer system resulting from said instructions.

6. A method as in claim 3, wherein said investigation includes executing one or more device-dependent instructions in the computer system to obtain a device-assigned return code for determining the type of device being assigned to a device address.

7. A method as in claim 5, wherein said computer system produces operation exceptions when certain instructions are executed by the computer system and includes the step of monitoring for operation exceptions resulting from executing instructions.

8. A method as in claim 6, wherein the computer system includes a plurality of control blocks in the system control program and wherein said method further comprises the step of adjusting said control blocks in response to said device-dependent return codes resulting from executing said device-dependent instructions.

9. A method as in claim 6, wherein said device-dependent instructions include a sense command.

10. A method as in claim 1, wherein said computer executes instructions defined by a System/370 architecture.

11. In a computer system which is capable of having different operating configurations, which is capable of having different operating characteristics, which is capable of multiple initializations, which includes a main memory with selectable size, and which includes a selectable number of input/output channels, each channel capable of communicating with more than one external device each with different operating characteristics, an apparatus for operating the computer system under the control of a system control program, comprising:
- performing means for performing one or more instructions to cause an investigation, at each initialization of the computer system, of the operating characteristics and configuration of the computer system; and
- adjusting means responsive to the performing means for adjusting the system control program, in response to said investigation after each initialization of the computer system, to the operating characteristics and configuration of the computer system to enable the system control program to control the operation of the computer system.

12. The apparatus as in claim 11, wherein the computer system is capable of addressing data and instructions with different sizes of addresses and wherein said operating characteristics include the size of addresses for addressing data and instructions in the computer system.

13. The apparatus as in claim 11, wherein the computer system is capable of having system configurations formed of different types of external devices coupled to the computer system in different ways and wherein said system configurations differ as a function of the types of external devices being coupled to the computer system and the way in which the devices are coupled to the computer system.

14. The apparatus as in claim 11, wherein the system configurations include multiprocessor and single-processor configurations.

15. The apparatus as in claim 11, including means for executing one or more instructions and monitoring return codes resulting from said instructions.

16. The apparatus as in claim 13, including means for executing one or more device-dependent instructions to obtain a device-dependent return code for determining the type of device being assigned to a device address.

17. The apparatus as in claim 15, wherein said computer system produces operation exceptions when certain instructions are executed by the computer system and includes means for monitoring for operation exceptions resulting from executing an instruction.

18. The apparatus as in claim 16 wherein the computer system includes means for providing a plurality of control blocks in the system control program and wherein said computer system includes means for adjusting said control blocks in response to return codes resulting from executing said device-dependent instructions.

19. The apparatus as in claim 16, wherein said device-dependent instructions include a sense command.

20. The apparatus as claim 11, wherein said computer system has means for executing instructions defined by a System/370 architecture.

* * * * *